(12) United States Patent
Vinck et al.

(10) Patent No.: US 9,038,788 B2
(45) Date of Patent: May 26, 2015

(54) DISC BRAKE HAVING A LATCH FOR LOCKING THE CONVERSION CARTRIDGE BY MEANS OF A LATCH

(75) Inventors: Jan Vinck, Beaufort en Vallee (FR); Fabien Chaigneau, Rochefort sur Loire (FR)

(73) Assignee: Chassis Brakes International B.V., Amsterdam (NL)

( * ) Notice: Subject to any disclaimer, the term of this patent is extended or adjusted under 35 U.S.C. 154(b) by 121 days.

(21) Appl. No.: 13/880,935

(22) PCT Filed: Sep. 21, 2011

(86) PCT No.: PCT/EP2011/066390
§ 371 (c)(1),
(2), (4) Date: Apr. 22, 2013

(87) PCT Pub. No.: WO2012/052245
PCT Pub. Date: Apr. 26, 2012

(65) Prior Publication Data
US 2013/0206519 A1 Aug. 15, 2013

(30) Foreign Application Priority Data
Oct. 22, 2010 (FR) ..................................... 10/04171

(51) Int. Cl.
*F16D 55/26* (2006.01)
*F16D 55/22* (2006.01)
(Continued)

(52) U.S. Cl.
CPC ............ *F16D 55/22* (2013.01); *F16D 2121/02* (2013.01); *F16D 2121/14* (2013.01);
(Continued)

(58) Field of Classification Search
CPC ..... F16D 55/22; F16D 55/224; F16D 55/225; F16D 65/14; F16D 65/16; F16D 65/18; F16D 2121/14; F16D 2125/20; F16D 2125/36; F16D 2125/38

USPC ............................. 188/72.1, 72.7, 72.8, 72.9
See application file for complete search history.

(56) References Cited

U.S. PATENT DOCUMENTS 8,069,961 B2 * 12/2011 Watada ......................... 188/72.8
8,177,038 B2 * 5/2012 Watada et al. ............... 188/72.8
(Continued)

FOREIGN PATENT DOCUMENTS

| EP | 1757836 | 2/2007 |
|---|---|---|
| EP | 1936227 | 6/2008 |
| WO | 2009016680 | 2/2009 |

OTHER PUBLICATIONS

International Search Report for Application No. PCT/EP2011/066390 dated Nov. 11, 2011 (2 pages).

*Primary Examiner* — Thomas J Williams
(74) *Attorney, Agent, or Firm* — Michael Best & Friedrich LLP (57) ABSTRACT

A disc brake comprising a floating stirrup and a brake piston controlled via a motion conversion cartridge (200) comprising a rear part pressed against the bottom of the stirrup and a control shaft passing through the bottom. The front part of the cartridge is pressed against the brake piston. It comprises a piston (240) provided with a plate (242) cooperating with the plate (212) of the control shaft (210) with the interposition of balls cooperating with tracks in the form of ramps for transforming the relative rotational motion of the plate (212) relative to the other (242) into a translational motion of the piston (240). The cartridge (200) is held in place in its housing (113) by a cage (260) attached elastically to the wall of the housing. The plate of the piston (240) comprises longitudinal grooves (243) receiving the branches (233) of a lock (230) which is elsewhere blocked in rotation in the housing of the stirrup while leaving the conversion piston (240) free in translation.

10 Claims, 5 Drawing Sheets (51) Int. Cl.
*F16D 65/18* (2006.01)
*F16D 121/02* (2012.01)
*F16D 121/14* (2012.01)
*F16D 125/36* (2012.01)
*F16D 121/04* (2012.01)
*F16D 123/00* (2012.01)
*F16D 127/06* (2012.01)
*F16D 131/00* (2012.01)

(52) U.S. Cl.
CPC .......... *F16D2125/36* (2013.01); *F16D 65/183* (2013.01); *F16D 2121/04* (2013.01); *F16D 2123/00* (2013.01); *F16D 2127/06* (2013.01); *F16D 2131/00* (2013.01)

(56) References Cited

U.S. PATENT DOCUMENTS 8,939,265 B2 * 1/2015 Vinck et al. .................. 188/72.6
2008/0121473 A1 * 5/2008 Kang ........................... 188/72.7

* cited by examiner

DISC BRAKE HAVING A LATCH FOR LOCKING THE CONVERSION CARTRIDGE BY MEANS OF A LATCH

FIELD OF THE INVENTION

The present invention relates to a disc brake comprising a floating stirrup straddling the brake disc, bearing a fixed shoe and forming a cylinder housing a piston bearing a mobile shoe for clamping the brake disc, the piston being controlled by the hydraulic circuit and by the parking brake system via a motion conversion cartridge transforming the pivoting motion of the pivoting lever linked to the parking brake and borne by the stirrup into a translational motion for pushing the brake piston, the cylinder having a front part housing the brake piston and a rear part forming a housing receiving the conversion cartridge, with shape of revolution, coming against the mobile shoe and the bottom of the cylinder, the cartridge passing, in a seal-tight manner, through an axial orifice in the bottom of the cylinder to link its control shaft to the pivoting lever of the parking brake.

STATE OF THE ART

Such a disc brake, described in the document EP 1 936 227, is already known. This document relates notably to a method for assembling a disc brake and in particular the assembly of the cartridge converting the rotational motion of the lever of the parking brake into a translational motion of the brake piston in order to apply the parking brake or release it.

In this setup, the rear part of the cartridge comprises a pin that fits into a hole in the bottom of the housing receiving the cartridge in the cylinder of the brake stirrup. This embodiment is relatively complicated both to manufacture and to install and the pin is subject to significant rotational forces during the actuation of the hand brake.

Figure 1:
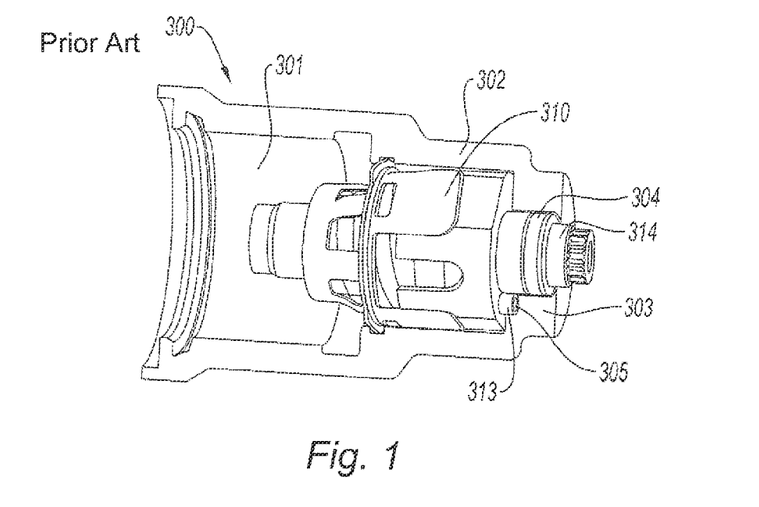
FIG. 1 is a cross-sectional view of a disc brake cylinder equipped with a conversion cartridge according to the state of the art.

In a more detailed manner according to the document EP 1 936 227, FIG. 1 shows the cylinder 300 of a disc brake, known, housing the piston, not represented, controlling the moving shoe of the brake. The piston is actuated by the brake fluid under pressure sent into the chamber 301 delimited in the cylinder 300. The chamber 301 is also occupied by a conversion cartridge 310 for converting the motion of the hand brake into a brake disc blocking action. The cartridge 310 is housed in the extension 302 of the cylinder 300 and it passes, in a seal-tight manner, through an orifice 304 in the bottom 303 of the extension 302 in order to externally receive the pivoting lever linked to the control of the handbrake. The pivoting motion of the lever is transformed by the cartridge into a translational motion that advances the piston through a mechanical action via the conversion piston which in turn compensates the wear of the brake pads.

Figure 2:
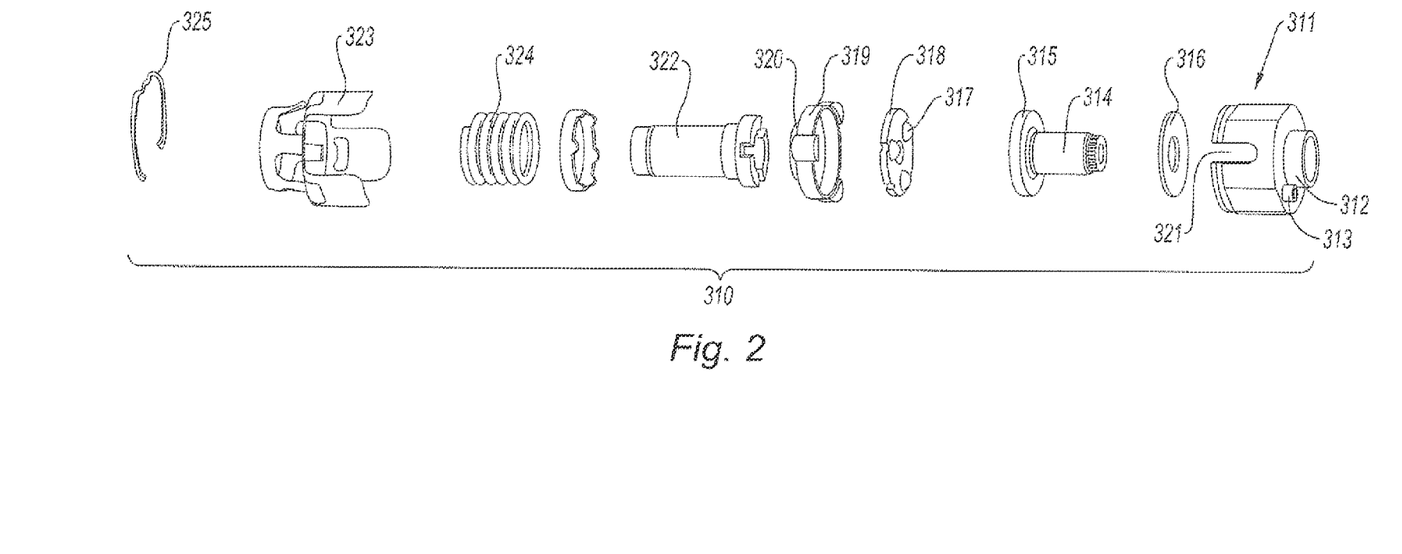
FIG. 2 is an exploded view of the conversion cartridge, of FIG. 1.

The exploded view of FIG. 2 shows the structure of the known cartridge 310, consisting of a bearing 311 in the form of a pot terminated by a sleeve 312 and provided with a rotation-blocking pin 313.

The bearing 311 receives a transmission axis 314 provided with a plate 315 with the interposition of a washer 316 to allow the rotation of the plate 315 against the bottom of the bearing 311; the transmission axis 314 borne by the sleeve 312 leaves through the bottom 313 of the extension 302 to receive the pivoting lever of the handbrake.

The front face of the plate 315 is provided with grooves of variable depth to cooperate with the balls 317 borne by a cage 318. The balls 317 also cooperate with another plate 319 provided with grooves matching those of the plate 315. The plate 319 comprises laterally protruding parts 320 intended to be housed in cutouts 321 in the bearing 311 to block the rotation of the plate 319 while guiding it, freely in translation, along the axis of the cartridge 310.

The plate 319 pushes the conversion piston 322 which acts on the piston of the brake.

The cage 323 holds the assembly of the parts 311-322 with the interposition of a compression spring 324. The cage 323 is attached to the bearing 311 and receives a clip 325 to fasten the cartridge 310 in the housing formed by an extension 302; the pin 313 is then engaged in a blind hole 305 in the bottom 303 of the extension 302 to block the rotation of the rear part of the conversion cartridge 310 as was explained above.

AIM OF THE INVENTION

The aim of the present invention is to simplify the manufacture of the brake stirrup by reducing the number of parts forming the motion conversion cartridge, the manufacture of the stirrup and installation.

EXPLANATION AND ADVANTAGES OF THE INVENTION

To this end, the invention relates to a disc brake of the type defined above, characterized in that the conversion cartridge comprises:
  a rear part pressed against the bottom of the housing of the cylinder and consisting of:
    a rotation-blocking lock in the form of a ring pressed around the axial orifice of the bottom of the housing, and bearing at least one cylindrical branch, directed forwards parallel to the axis, and
    a control shaft linked to the pivoting lever consisting of a sleeve passing through the ring, and a plate coming in front of the ring in the perimeter defined by the branch of the lock,
    the front face of the plate comprising ramps,
  a front part pressed against the brake piston, mobile in translation relative to the cylinder but blocked in rotation, and consisting of:
    a conversion piston provided with a (second) plate intended to cooperate with the (first) plate of the control shaft with the interposition of mobile balls in ramps of the two plates to transform the relative rotational motion of the two plates into a translational motion of the conversion piston to act on the brake piston, and
    the edge of the second plate comprises at least one rotation-locking axial groove for receiving the corresponding branch of the lock,
  a cage for retaining the conversion piston in the cylinder via a clip and a return spring interposed between the cage and the conversion piston, acting against the translational motion generated by the plates and the balls,
the cylinder comprises, in its rear part forming the housing receiving the conversion cartridge, at least one longitudinal groove receiving the locking branch of the lock, the branch being elsewhere engaged in an axial groove of the second plate.

Thus, the rotation blocking (or antirotation effect) of the piston of the converter, that is to say the mobile nut of the converter, is produced directly by the stirrup and the conversion cartridge provided with the lock engaged on the rear of the conversion cartridge to block the rotation of the conversion piston, the lock itself being blocked in rotation by its engagement in the grooves of the housing of the stirrup.

The rear box of the cartridge and its antirotation pin intended to be placed in a hole in the bottom of the stirrup are thus very advantageously eliminated. This box or cage of the rear part is replaced by the single rear bearing formed by the lock. The elimination of the cage of the rear part improves the ability to bleed the brake circuit since there is no part enclosed in the motion converter according to the invention. This also simplifies the production of the cage, and shortens the length of the cylinder or stock of the stirrup receiving the cartridge.

The invention simplifies the assembly of the cartridge which is done directly in the brake assembly line; a machine dedicated to the preparation of the assembled cartridge is thus eliminated. There is no longer any clipping of the cage onto the rear box which eliminates the risk of the formation of chips.

Finally, this embodiment can be applied to pistons of a diameter smaller than that of the pistons currently used and with identical piston forces.

According to another advantageous feature:
the housing of the cartridge in the stirrup and the plate of the conversion piston each comprise three longitudinal grooves, and
the lock is provided with three longitudinal branches,
the grooves being distributed equi-angularly and facing one another and the branches being in positions matching those of the grooves are each housed both in a groove of the housing and a groove of the plate of the piston.

These three longitudinal grooves both in the housing of the stirrup and in the plate of the conversion piston and the three longitudinal branches of the lock blocking the conversion piston provide for excellent blocking of the rotation of the piston while avoiding the problems associated with the significant torque which can be applied to the conversion piston by the link consisting of the ball transmission between the plates. This excellent rotation blocking also favours the return of the conversion piston when the parking brake is released.

According to another advantageous feature, the lock consists of a ring bearing three longitudinal branches, parallel to the axis, and a sleeve extending beyond the ring on the side opposite that bearing the branches, the sleeve being intended to pass partially through the bottom of the housing of the cylinder, the ring being pressed around the axial orifice of the bottom of the housing and constituting a bearing for the plate of the control shaft.

This embodiment of the lock ensures both the balancing of the forces transmitted by the motion converter to the lock and by the lock to the housing of the stirrup while serving as a rotation bearing for the rear part of the converter, that is to say the plate of the control shaft. This part is particularly simple to produce and, since it is subject only to very weak shear forces in its blocked position between the conversion piston and the housing of the stirrup, this part is produced easily in plastic material.

The forces received by the branches of the lock and which are then transmitted to the housing of the stirrup are distributed over large surface areas so that the local forces are weak. This is particularly important for the longevity of this part and of the duly equipped disc brake as a whole.

According to another advantageous feature, the groove of the housing has an arc-of-circle section and the branch of the lock has a rectangular section with one side in the form of an arc-of-circle with a radius substantially equal to that of the groove into which the branch penetrates at least over a part of its section with a section in arc-of-circle form equal to that of the groove. This form of grooves and branches is very easy to produce, particularly the machining of each groove.

The curved forms coming one against the other are arc-of-circle forms that are homothetic relative to one and the same centre of curvature, so as to take account of the difference, however small, which can exist between the internal surface of the groove of the housing and the external surface of the branch.

According to another advantageous feature in this context, the plate of the piston has at least one groove of rectangular section.

Thus, overall, each branch of the lock has a rectangular section with two straight sides and two curvilinear opposite sides, one convex for the part coming into the groove of the housing of the stirrup and the other concave closely following the convex form of the bottom of the matching groove of the plate of the control piston.

In fact, the groove of the stirrup and the matching one of the plate of the control piston complement one another to form the housing of a branch of the lock. In as much as the plate of the piston is moved in translation along the branches of the lock, it is advantageous for the lateral sides of each groove of the plate of the conversion piston to be planar surfaces which are either parallel to the axis median plane of the branch or directed radially to pass through the axis of the housing of the stirrup.

The bottom of the groove of the plate of the piston can be planar and the corresponding side of the branch of the lock will be planar. This makes it easier to machine either the mould or the groove, if this machining is done directly on the plate of the conversion piston.

The length of the longitudinal rib thus formed by a branch and, above all, the length of the longitudinal ribs, preferably three of them, of the conversion piston, allow for excellent guiding and excellent holding of the piston in the stirrup. The branches extending forward make it possible to reduce the axial length of the conversion cartridge without this being detrimental to the guiding.

According to another advantageous feature, the housing of the cartridge comprises a shoulder receiving, bearing against it, the flange of the cage and a peripheral groove to receive the clip.

According to another advantageous feature, the cage is a part made of elastic steel of overall tapered form having a bottom in the form of a ring bearing blades linked to a flange and intermediate blades, with free ends, receiving the clip.

This cage and its cooperation on the one hand with the shoulder and on the other hand with the peripheral groove receiving the clip allow for an excellent solid attachment of the conversion cartridge in its housing for the stock of the stirrup. This attachment cannot open itself. It requires a particular tool such as a sleeve, bearing on the tapered form of the cage to progressively tighten the blades of the cage and thus make it possible, by the re-entrant motion, to retract the flange and release it from its groove. The fitting operation is carried out in the same conditions, proceeding in the reverse order.

Overall the disc brake equipped with such a motion conversion cartridge is simple to produce and to assemble by virtue of the small number of parts. It allows for excellent operation of the brake and guarantees the reliability thereof.

DRAWINGS

The present invention will be described hereinbelow in more detail using the appended drawings in which.

DESCRIPTION OF AN EMBODIMENT OF THE INVENTION

Figure 3:
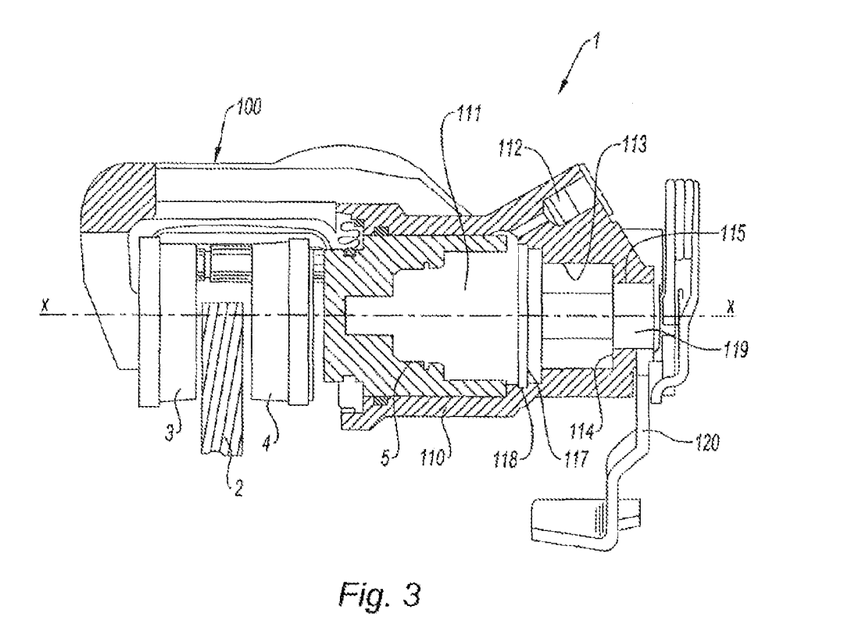
FIG. 3 is a schematic cross-sectional view of a brake stirrup according to the invention installed on the disc brake, showing the brake piston without the conversion cartridge.

By convention, to simplify the description of the disc brake according to the invention, the orientation that will be used is that given by the axis xx of FIG. 3, the left side of which is directed towards what is considered to be the front and the right side of which is directed towards what is considered to be the rear: thus, the front of the brake piston is turned towards its brake shoe 4 and the rear of the brake piston 5 is turned towards its housing 113 in the stirrup 100. Similarly, the motion converter will have a front part on the side of the brake piston and a rear part on the side of the bottom of its housing in the stirrup.

According to FIG. 3, the invention relates to a disc brake 1 associated with the braking circuit and with the control of the parking brake. The floating stirrup 100 straddles the brake disc 2 and bears a fixed shoe 3 and a mobile shoe 4. The latter is actuated by a brake piston 5 housed in the cylinder 110 (or stock) of the stirrup 100. The cylinder 110 delimits a sealed chamber 111 linked to the brake circuit by a connection 112 that is not detailed. This sealed chamber 111 also houses a motion conversion cartridge 200 (FIGS. 4A, 4B) applied against the bottom 114 of the housing 113 of the cylinder of the stirrup. The housing 113 extends the cylinder 110. The bottom 114 is provided with an orifice 115 that the end of the cartridge 200 passes through in a seal-tight manner to establish the drive link with the pivoting lever 120 linked to the control of the handbrake, the rotational (pivoting) motion of which will be transformed into a translational motion applied to the brake piston 5.

Figure 4A:
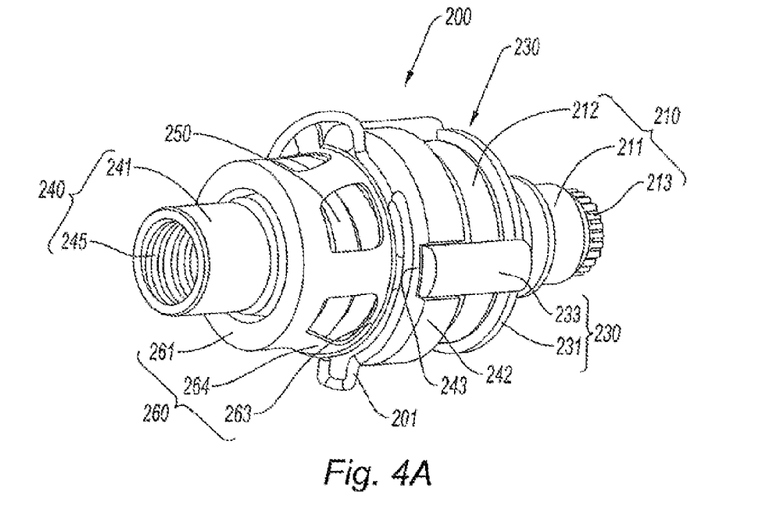
FIGS. 4A, 4B show two perspective views from opposite directions of the conversion cartridge according to the invention.
Figure 4B:
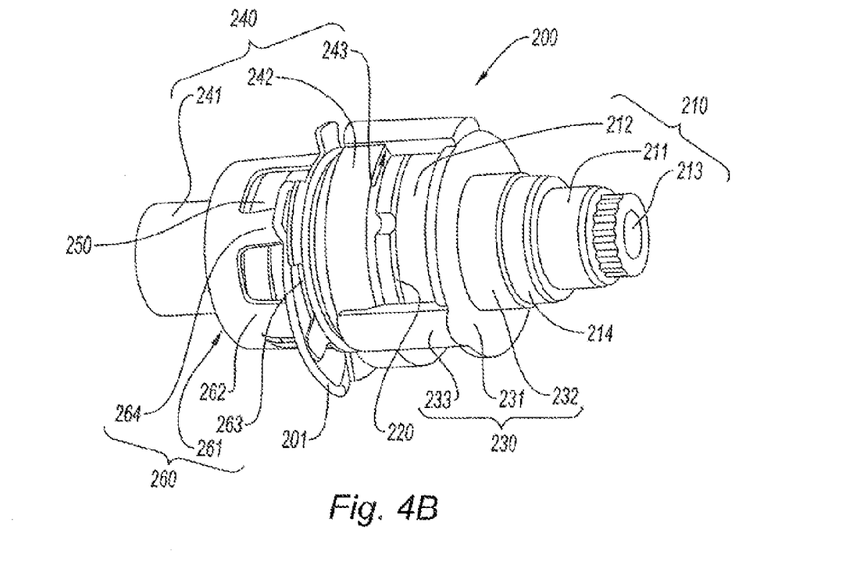

The motion conversion cartridge 200 represented in FIGS. 4A, 4B consists of a control shaft 210 linked to the pivoting lever receiving the motion of the handbrake, a cage 220 holding balls, a rotation-blocking lock 230 and a conversion piston 240 with a compression spring 250 and a cage 260 enclosing the whole and making it possible to fasten the conversion cartridge 200 in the housing 113 by blocking it in translation by a clip 201.

The cartridge 200 is blocked in rotation in the housing 113 by the lock 230, the branches 233 of which are blocked in rotation in matching grooves 119 produced in the housing 113. The part of the cartridge excluding the conversion piston 240 is blocked in translation by the cage 260 pressed against the shoulder 117 and the clip 201 deployed at the back. The cartridge 200 bears the rotation-blocking lock 230 consisting of a ring 231 extended towards the rear by a sleeve 232 and towards the front by locking branches 233. This lock 230 encloses or receives, free in rotation, the control shaft 210 formed by a cylindrical sleeve 211 housed in rotation in the sleeve 232 of the lock and provided with a plate (first plate) 212 against which the ring 231 of the lock 230 is pressed externally. Behind the sleeve 232, a ring 214 bears an 0-ring seal to ensure the seal-tightness of the sleeve 232 housed in the orifice 15 of the stirrup. The sleeve 211 of the control shaft 210 passes through a staged part of the orifice 115 (part not detailed) or protrudes outside. The end of the shaft is provided with a fitment 213 for fastening the pivoting lever linked to the handbrake.

At the front, a cage 220 provided with balls is interposed between the plate 212 and the plate 242 thus forming the means for converting the pivoting motion of the shaft 210 into a translational motion of the conversion piston 240. In practice, the front face of the first plate 212 and the rear face of the second plate 242 comprise grooves of variable depth. These grooves are matching and associated in pairs to receive the balls borne by the cage 220 so that the pivoting motion of the plate 212 (free in pivoting) relative to the plate 242 (blocked in pivoting) produces a translational motion of the plate 242 and consequently of the conversion piston 240.

The plate 242 comprises axial grooves 243 for receiving the branches 233 of the lock 230 and thus be solidly attached in rotation to the branches 233 while being able to slide relative thereto in the direction of the axis. Since the branches 233 are themselves locked in the grooves 119 of the housing 113 of the stirrup 100, the second plate 242 is thus blocked in rotation.

The conversion piston 240 is extended towards the front by a sleeve 241 provided internally with a threading 245 forming a nut and being used to compensate the wear of the brake pads by a theoretically non-reversible rotation mechanism, known per se and not described here.

Figure 5:
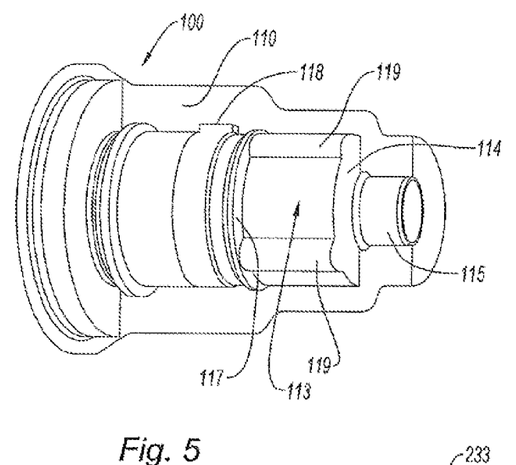
FIG. 5 is an axial cross-sectional view of the cylinder of the brake stirrup according to the invention showing, in negative, the form of the internal volume of the cylinder of the brake stirrup.

FIG. 5 shows, in negative, the form of the internal volume of the stirrup 100 at the level of the cylinder 110 and of the housing 113 with the axial grooves 119 and the orifice 115 in the bottom 114 of the housing 113. The shoulder 117 serves as a bearing surface for the ring of the lock behind the peripheral groove 118 receiving the clip 201.

Figure 6A:
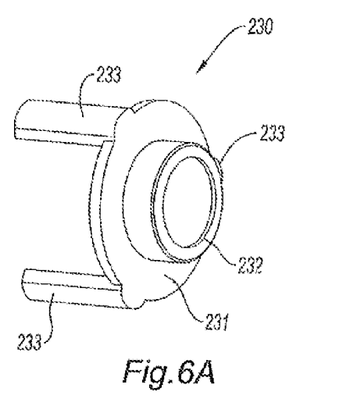
FIGS. 6A, 6B are perspective views from two different directions of the conversion cartridge rotation blocking lock.
Figure 6B:
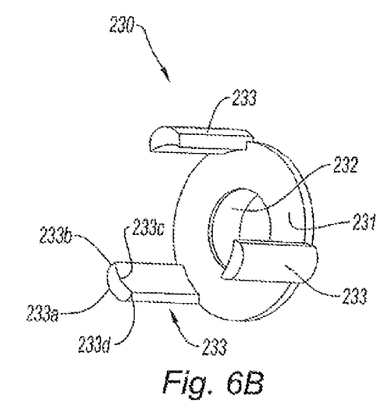

FIGS. 6A, 6B show the lock 230 from two isometric views corresponding to different directions. The lock 230 consists of the ring 231 bearing the cylindrical branches 233 parallel to the axis XX, and being extended towards the rear by the sleeve 232. The form of the section of the locking branches 233 can be likened to a curvilinear rectangle whose large internal side 233a facing the axis XX has a radius of curvature centred on the axis XX and whose large external side 233c that fits into the respective groove 119 has a highly accentuated curvature. The curvilinear sides 233a, 233c meet straight sides 233b, 233d directed radially or parallel to the radial direction passing through the middle of the section of each branch. The branches 233, of which there are three, are distributed equi-angularly.

Figure 7:
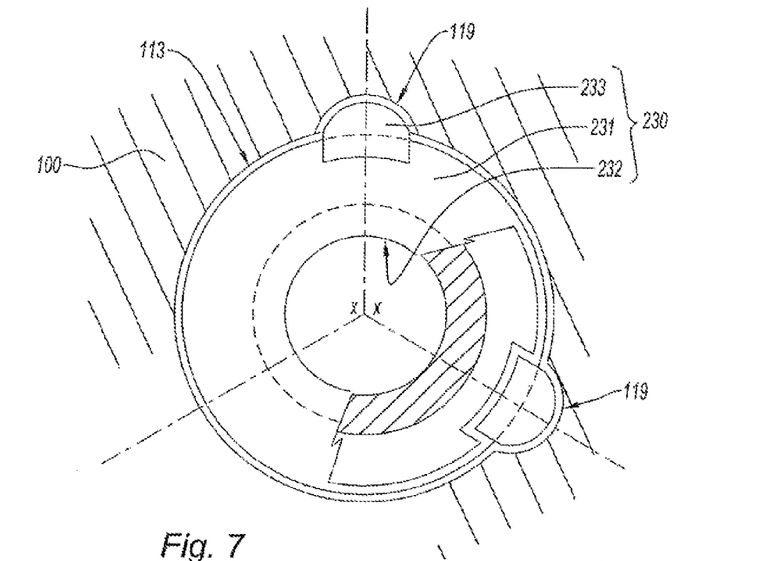
FIG. 7 is a schematic plan view of the lock and of its installation in the stirrup.

FIG. 7 is an axial view of the converter with its lock 230 and the conversion piston 240 installed in the housing 113 of the stirrup 100, revealing the form of the groove 119 of the housing 113, that of the branch 233 of the lock 230 and that of the groove 243 of the plate 242 of the piston 240.

As already indicated, the locking of the converter in the stirrup is done using a lock 230, here with three branches, only two of which are represented in order to simplify the drawing.

The branches 233 have a cylindrical form directed axially, parallel to the axis XX and of curvilinear rectangular section, adapted to both the form of the groove 119 of the stirrup and that of the plate 242 of the piston 240.

The groove 119 has an arc-of-circle section of small radius relative to the radius of the housing 113. The part of the branch 233 that fits in the groove 119 has an arc-of-circle section forming a rounded side 233a of the section of the branch with an identical, or more precisely homothetic, radius centred on the same centre of curvature as the radius of the groove 119.

The sides 233b and 233d of the branch 233 are straight (planar), parallel to the median plane of the branch 233 passing through the axis XX. The sides 233b, 233d can also be planar, directed radially, that is to say passing through the axis XX. This variant is not represented.

The section of the branch 233 extends beyond the contour of the ring 231 not only by the sides 233a but also by parts of the sides 233b, 233d. The fourth side 233c is a curved side as represented. It can also be straight, that is to say planar.

The branch 233 that is housed fastened in the groove 119 translationally guides the ring 242 into which the branch penetrates by its side 233c and a part of its sides 233b, 233d.

Figure 7A:
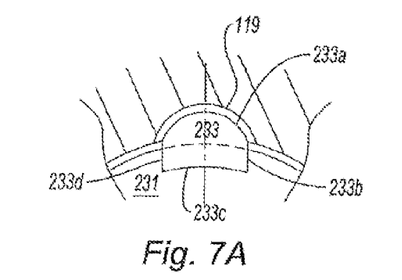
FIG. 7A is a detail view of a branch of the lock of FIG. 7.
Figure 7B:
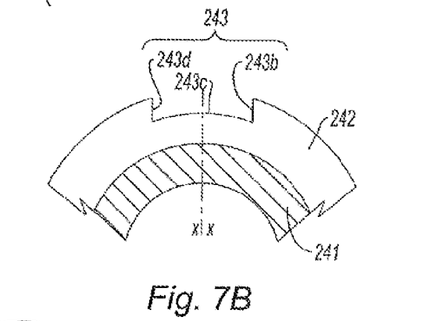
FIG. 7B shows the detail of the lock at the level of an axial groove.

The groove 243 has a section corresponding to that of the section of the branch 233. The form of the section of the groove 243 is a U-shape with sides 243b, 243d matching the sides 233b, 233d of the branch 233 and the bottom 243c is of a form matching that of the side 233c of the branch 233; in this example, the side 233c is curved, for example in an arc of circle centred on the axis XX according to a variant not represented, the bottom 243c is straight and the side 233c of the branch is also straight which simplifies the machining of the groove 243 if said groove is not injection moulded. The detail of the forms of the branch 233 and of the groove 243 appears in FIGS. 7A, 7B.

Figure 8:
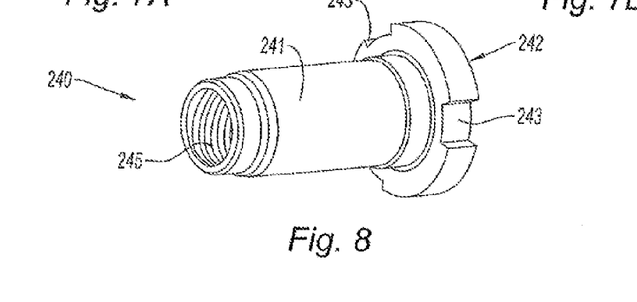
FIG. 8 is a perspective view of the conversion piston.

FIG. 8 shows an isometric view of the conversion piston 240 consisting of its plate 242 of which the rear face provided with the grooves of variable depth does not appear (it is a means that is known per se), and which comprises grooves 243 throughout the thickness of the plate 242 to receive the branches 233 as has been described above. The plate 242 is continued towards the front by the cylindrical sleeve 241 which externally receives the compression spring 250 (FIG. 4A, 4B), the front end of which is provided internally with a threading 245 for the automatic wear compensation mechanism.

The rear face of the plate 242 of the conversion piston 240 is provided with grooves of variable depth, complementing, in their arrangement and their form, those of the grooves of variable depth (not visible) of the first plate 212 of the control shaft 210. The balls, of which there are for example three, of the cage 230 are intended to roll in the matching grooves of the plate 212 of the control shaft 210 and those of the plate 242 of the piston 240 to transform the rotational motion of the plate 212 of the control shaft 210 into a translational motion of the conversion piston 240 by the play of the complementary ramps formed by the grooves as is known per se. A compression spring 250 is fitted onto the cylindrical sleeve 241 of the conversion piston and is pressed on the one hand against the plate 242 and on the other hand against the bottom 261 of a cage 260 which is also installed on the sleeve 241 of the piston 240.

The cage 260 is a part made of elastic steel, of overall tapered form, comprising a ring forming the bottom 261 on the front side, bearing blades 262 linked in pairs to the two parts of a slotted flange 263 facing outwards and intermediate blades 264, which are free. The clip 201 is installed in the cage 260 around and between the blades 262, 264, to retain the converter 200 in its housing 113 of the stirrup 100. For fitting in a manner that is known per se, the slotted flange 263 and the clip 201 are compressed using a tool in the form of a sleeve. The clip 201 retains the cage 260 by cooperating with a peripheral groove 118 and the slotted flange 263 takes it place in the housing 113 against a shoulder 117 in the stirrup 100, as is done by the mounting method described in the document EP 1 936 227 cited here for reference. The cartridge 200 is thus blocked in its housing 113 in one direction by its pressing via the slotted flange 263 against the shoulder 117 and in the opposite direction by the clip 201 attached in the peripheral groove 118, only the control rod 210 and the piston 240 remaining free to move.

The piston 240 (FIG. 7) comprises one or more longitudinal grooves 243 in order to thus to be blocked in rotation in the housing 113 while remaining free in translation. The branches 233 straddle the rear part at the level of the edge of the plate 212 and the disc forming the cage 231 holding the balls is also held by the branches which is important for the production of the subassembly consisting of the conversion cartridge, and this makes it easier to install it in the housing 113.

After installation of the cartridge 200, the control shaft 210 and its plate 212 are, on the other hand, free in rotation so that the rotational motion of the control shaft 210 is translated into a relative rotation of its plate 212 in relation to the plate 242 integrated with the piston 240 and produces the translational motion of the piston 240, transmitted to the brake piston 5.

The conversion piston 240 is pressed against the rear of the brake piston 5 by a wear compensator that is not represented, housed in the piston 240 forming a nut of a screw-nut link. The compensation of the wear of the brake shoes is obtained in a manner known to the person skilled in the art during the nut removal motion, on releasing the parking brake.

The cartridge 200 consists of a small number of parts and constitutes an assembled unit, ready to be installed in the stock of the brake stirrup 100. This fitting neither hampers nor complicates the subsequent installation of the brake piston and does not then disrupt the bleeding of the brake circuit.

The present invention relates to the field of motor vehicle disc brake systems.

PARTS LIST OF THE MAIN ELEMENTS

1 Disc brake
2 Brake disc
3 Fixed shoe
4 Mobile shoe
5 Brake piston
17 Peripheral groove of the housing
100 Stirrup
110 Cylinder
111 Piston chamber
112 Connection
113 Housing
114 Bottom of the housing
115 Orifice of the bottom of the housing
117 Shoulder
118 Peripheral groove
119 Groove
120 Lever 200 Motion conversion cartridge
201 Clip
210 Control shaft
211 Cylindrical sleeve
212 First plate
213 Fitment
214 Ring with O-ring seal
220 Cage
230 Rotation-blocking lock
231 Ring
232 Sleeve
233 Locking branch
233a Side of the branch 233
233b Side of the branch 233
233c Side of the branch 233
233d Side of the branch 233
240 Conversion piston
241 Sleeve
242 Second plate
243 Axial locking groove
243b Side of the groove 243
243c Side of the groove 243
243d Side of the groove 243
245 Nut
250 Return spring
260 Cage
261 Bottom
262 Blade
263 Slotted flange
264 Intermediate blade
300 Cylinder
301 Chamber
302 Extension of the cylinder
304 Orifice of the bottom
303 Bottom
305 Blind hole
310 Cartridge
311 Bearing
312 Sleeve
313 Pin
314 Transmission axis
315 Plate
316 Washer
317 Balls
318 Cage
319 Plate
320 Protruding part
321 Cutout
322 Conversion piston
323 Cage
324 Compression spring

The invention claimed is:

1. A disc brake comprising a floating stirrup (100) straddling the brake disc (2) bearing a fixed shoe (3) and forming a cylinder (110) housing a piston (5) bearing a mobile shoe (4) for clamping the brake disc, the piston (5) being controlled by an hydraulic circuit and by a parking brake system via a motion conversion cartridge (200) transforming a pivoting motion of a pivoting lever (120) linked to a parking brake, borne by the stirrup (100), into a translational motion for pushing the brake piston (5), the cylinder (110) having a front part housing the brake piston (5) and a rear part forming a housing (113) and receiving the conversion cartridge (200), the cartridge (200) passing, in a seal-tight manner, through an axial orifice (115) in a bottom (114) of the housing (113) of the cylinder (110) to link a control shaft (210) to the pivoting lever (120) of the parking brake, characterized in that A) the conversion cartridge (200) comprises:
a rear part pressed against the bottom (114) of the housing (113) of the cylinder (110) and consisting of:
a rotation-blocking lock (230) in the form of a ring (231) pressed around the axial orifice (115) of the bottom (114) of the housing (113), and bearing at least one locking branch (233), that extends forward parallel to the axis, and a control shaft (210) linked to the pivoting lever (120) of the parking brake, the control shaft (210) including a sleeve (211) passing through the ring (231), and a first plate (212) coming in front of the ring (231) in the perimeter defined by the locking branch (233) of the lock, a front face of the first plate (212) comprising ramps,
a front part pressed against the brake piston (5), mobile in translation relative to the cylinder (110) but blocked in rotation, and consisting of:
a conversion piston (240) including a second plate (242) intended to cooperate with the first plate (212) of the control shaft (210) with the interposition of mobile balls in ramps of the first and second plates (212, 242) to transform the relative rotational motion of the first and second plates (212, 242) into a translational motion of the conversion piston (240) to act on the brake piston (5), and
the edge of the second plate (242) comprises at least one rotation-locking axial groove (243) for receiving the corresponding locking branch (233) of the lock (230),
a cage (260) for retaining the conversion piston (240) in the cylinder (110) via a clip (201) and a return spring (250) interposed between the cage and the conversion piston (240), acting against the translational motion generated by the plates (212, 242) and the balls,
B) the rear part of the cylinder (110) that forms the housing (113) and receives the conversion cartridge (200) includes at least one longitudinal groove (119) that receives the locking branch (233) of the lock (230), wherein the locking branch (233) also engages the at least one rotation-locking axial groove (243) of the second plate (242).

2. The disc brake according to claim 1, characterized in that the housing (113) of the cartridge (200) in the stirrup (100) and the plate (242) of the conversion piston (240) each comprise three longitudinal grooves (119, 243) and the lock (230) is provided with three longitudinal locking branches (233), the grooves (119, 243) being distributed equi-angularly and facing one another and the locking branches (233) being in positions matching those of the grooves (119, 243), such that each of the locking branches (233) is housed both in a respective one of the three longitudinal grooves (119) of the housing (113) and a respective one of the three longitudinal grooves (243) of the plate (241) of the piston (240).

3. The disc brake according to claim 1, characterized in that the ring (231) bears three longitudinal locking branches (233), parallel to the axis, and the sleeve (211) extends beyond the ring (231) on the side opposite that bearing the locking branches (233), the sleeve (211) being intended to pass partially through the bottom of the housing (113) of the cylinder (110), the ring (231) pressed around the axial orifice (115) of the bottom of the housing (113) constituting a bearing for the plate (212) of the control shaft (210).

4. The disc brake according to claim 1, characterized in that the groove (119) of the housing (113) has an arc-of-circle section and the locking branch (233) of the lock has a rectangular section with one side in the form of an arc-of-circle with a radius substantially equal to that of the groove into which the locking branch (233) penetrates at least over a part of its section (119).

5. The disc brake according to claim 1, characterized in that the at least one rotational-locking axial groove (243) has a rectangular section.

6. The disc brake according to claim 1, characterized in that the cage (260) includes a flange (263) and the housing (113) of the cartridge (200) comprises a shoulder (117) to receive, bearing against it, the flange (263) of the cage (260) and a peripheral groove (118) to receive the clip (201).

7. The disc brake according to claim 1, characterized in that the cage (260) is a part made of elastic steel of overall tapered form having a bottom (261) in the form of a ring bearing blades (262) linked to a slotted flange (263) and intermediate blades (264), with free ends, receiving the clip (201).

8. The disc brake according to claim 2, characterized in that the ring (231) bears three longitudinal locking branches (233), parallel to the axis, and the sleeve (211) extends beyond the ring (231) on the side opposite that bearing the locking branches (233), the sleeve (211) being intended to pass partially through the bottom of the housing (113) of the cylinder (110), the ring (231) pressed around the axial orifice (115) of the bottom of the housing (113) constituting a bearing for the plate (212) of the control shaft (210).

9. The disc brake according to claim 1, characterized in that the locking branch (233) has a first length extending parallel to the axis of the disc brake and the ring (231) has a second length extending parallel to the axis, wherein the first length is greater than the second length.

10. The disc brake according to claim 9, characterized in that the first length is more than twice the second length.

\* \* \* \* \*